US012302278B2

(12) United States Patent
Gunnarsson et al.

(10) Patent No.: US 12,302,278 B2
(45) Date of Patent: May 13, 2025

(54) METHODS FOR SIGNALING BEAM ANGULAR INFORMATION FOR UE-BASED POSITIONING

(71) Applicant: Telefonaktiebolaget LM Ericsson (publ), Stockholm (SE)

(72) Inventors: Fredrik Gunnarsson, Linköping (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 17/798,643

(22) PCT Filed: Feb. 8, 2021

(86) PCT No.: PCT/SE2021/050089
§ 371 (c)(1),
(2) Date: Aug. 10, 2022

(87) PCT Pub. No.: WO2021/162610
PCT Pub. Date: Aug. 19, 2021

(65) Prior Publication Data
US 2023/0156654 A1    May 18, 2023

Related U.S. Application Data

(60) Provisional application No. 62/972,853, filed on Feb. 11, 2020.

(51) Int. Cl.
*H04W 64/00* (2009.01)
*G01S 5/02* (2010.01)
(Continued)

(52) U.S. Cl.
CPC ........... *H04W 64/00* (2013.01); *G01S 5/0236* (2013.01); *G01S 5/08* (2013.01); *H04W 16/28* (2013.01)

(58) Field of Classification Search
CPC ......... H04W 64/00; H04W 16/28; G01S 5/08; G01S 5/0236
(Continued)

(56) References Cited

U.S. PATENT DOCUMENTS

2002/0089437 A1    7/2002  Le et al.
2012/0184302 A1    7/2012  Kazmi et al.
(Continued)

FOREIGN PATENT DOCUMENTS

CN    107251586 A    10/2017
CN    109168174 A     1/2019
(Continued)

OTHER PUBLICATIONS

"3GPP TR 38.901 V16.1.0", 3rd Generation Partnership Project; Technical Specification Group Radio Access Network; Study on channel model for frequencies from 0.5 to 100 GHz (Release 16), Dec. 2019, pp. 1-101.
(Continued)

*Primary Examiner* — Ted M Wang
(74) *Attorney, Agent, or Firm* — Murphy, Bilak & Homiller, PLLC

(57) ABSTRACT

Embodiments include methods, performed by a network node, for providing positioning assistance data to one or more user equipment (UEs) in a wireless network. Such methods include determining an angular resolution of angular positioning assistance data for each particular beam of a plurality of beams transmitted by one or more transmission reception points (TRPs) in the wireless network. Such methods also include transmitting, to one or more UEs, the angular positioning assistance data for the plurality of beams. For each particular beam, the angular positioning assistance data includes a first part having a first resolution and, when the determined angular resolution for the particu-
(Continued)

lar beam is greater than the first resolution, a second part having a second resolution that is greater than the first resolution. Other embodiments include complementary methods performed by a UE, as well as network nodes and UEs configured to perform such methods.

26 Claims, 7 Drawing Sheets

(51) Int. Cl.
*G01S 5/08* (2006.01)
*H04W 16/28* (2009.01)
(58) Field of Classification Search
USPC ........................................................ 455/456.1
See application file for complete search history.

(56) References Cited

U.S. PATENT DOCUMENTS

| | | | |
|---|---|---|---|
| 2016/0255463 | A1 | 9/2016 | Das et al. |
| 2018/0324738 | A1* | 11/2018 | Stirling-Gallacher ... H04B 7/04 |
| 2019/0369201 | A1 | 12/2019 | Akkarakaran et al. |
| 2020/0053738 | A1 | 2/2020 | Harada et al. |
| 2021/0058131 | A1* | 2/2021 | Zhu ........................ H04B 7/088 |

FOREIGN PATENT DOCUMENTS

| | | |
|---|---|---|
| TW | 202005308 A | 1/2020 |
| WO | 2018173232 A1 | 9/2018 |
| WO | 2018203820 A1 | 11/2018 |
| WO | 2019054908 A1 | 3/2019 |
| WO | 2019091584 A1 | 5/2019 |

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.
"3GPP TS 33.501 V15.7.0", 3rd Generation Partnership Project; Technical Specification Group Services and System Aspects; Security architecture and procedures for 5G system (Release 15), Dec. 2019, pp. 1-191.
"3GPP TS 36.305 V15.4.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Jun. 2019, pp. 1-91.
"3GPP TS 37.355 V15.0.0", 3rd Generation Partnership Project; Technical Specification Group Radio Access Network; LTE Positioning Protocol (LPP) (Release 15), Dec. 2019, pp. 1-224.
"Assistance Data for DL-only UE-based mode", 3GPP TSG-RAN WG2 Meeting #108, R2-1915563, Reno, Nevada, Revision of R2-1913399, Nov. 18-22, 2019, pp. 1-14.
"Important LPP structural aspects", 3GPP TSG-RAN WG2 109-bis, R2-2003144, Electronic Meeting, Apr. 20-Apr. 30, 2020, pp. 1-24.
"NR RAT-dependent DL Positioning", 3GPP TSG RAN WG1 Ad-Hoc Meeting 1901, R1-1900310, Taipei, Jan. 21-25, 2019, pp. 1-19.
"Report on Structure of UE-based assistance data (Email discussion 949)", 3GPP TSG-RAN WG2 Meeting #110-e, R2-2004700, Online, Jun. 1-12, 2020, pp. 1-11.
"Structure of UE-based beam information assistance data (Extension to email discussion 949)", 3GPP TSG-RAN WG2 #110e, R2-20xxxxx, Online, Jun. 1-12, 2020, Jun. 1-12, 2020, pp. 1-4.
"Summary and Text Proposal on Structure of UE-based assistance data (Email discussion 949)", 3GPP TSG-RAN WG2 #110e, R2-2004705, Online, Jun. 1-12, 2020, pp. 1-10.
"Summary of (108#89][NR/Pos] UE-based downlink positioning assistance data-", 3GPP TSG-RAN WG2 Meeting #109, R2-2001234, Athens, Greece, Feb. 24-28, 2019, pp. 1-38.
"3GPP TS 38.305 V15.4.0", 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, pp. 1-72.
"Summary of [AT109e][624][POS] Open issues on UE-based downlink positioning assistance data", 3GPP TSG-RAN WG2 Meeting #109-e, R2-2001949, Online, Feb. 24-Mar. 6, 2020, pp. 1-20.
Qualcomm Incorporated "Assistance Data for DL-only UE-based mode" 3GPP TSG-RAN WG2 Meeting #108, R2-1915563, Reno, Nevada, USA, Nov. 18-22, 2019.
"Resolution of Remaining Opens for NR Positioning DL PRS Design", 3GPP TSG RAN WG1 Meeting#99, R1-1912228, Reno, USA, Nov. 18-22, 2019, pp. 1-26.
"Status Report to TSG", 3GPP TSG RAN meeting #86, RP-192580 (same as RP-193201), Sitges, Spain, Dec. 9-12, 2019, pp. 1-32.
Wei, et al., "Application of High Resolution Multibeam System in Reservoir Storage Capacity Survey", Zhejiang Hydrotechnics, No. 2 Total No. 210, Mar. 2017, pp. 89-91, English abstract attached.

* cited by examiner

```
DL-PRS-Beam-Info-ResourceSet-r16 ::= SEQUENCE {
   -- Applicable per Resource Set ID of the {TRP-ID; ID}
   dl-PRS-BeamInfoList-r16          SEQUENCE (SIZE(1..64)) OF DL-PRS-BeamInfoElement-r16,
   lcs-To-GCS-Translation           SEQUENCE {
      alpha                         INTEGER (0..3599),
      beta                          INTEGER (0..3599)                OPTIONAL,    -- Need OP
      gamma                         INTEGER (0..3599)                OPTIONAL,    -- Need OP
   },                                                                OPTIONAL,    -- Need OP
   ...
}

DL-PRS-BeamInfoElement-r16 ::= SEQUENCE {
   -- Applicable per Resource ID of the Resource Set ID
   dl-PRS-Azimuth-r16               INTEGER (0..3599),
   dl-PRS-Elevation-r16             INTEGER (0..1800)                OPTIONAL,    -- Need ON
   ...
}
```

FIG. 7

```
DL-PRS-Beam-Info-ResourceSet-r16 ::= SEQUENCE {
   -- Applicable per Resource Set ID of the {TRP-ID; ID}
   dl-PRS-BeamInfoList-r16          SEQUENCE (SIZE(1..64)) OF DL-PRS-BeamInfoElement-r16,
   lcs-To-GCS-Translation           SEQUENCE {
      alpha                         INTEGER (0..359),
      alpha-fine                    INTEGER (0..9),
      beta                          INTEGER (0..359)                 OPTIONAL,    -- Need OP
      beta-fine                     INTEGER (0..9)                   OPTIONAL,    -- Need OP
      gamma                         INTEGER (0..359)                 OPTIONAL,    -- Need OP
      gamma-fine                    INTEGER (0..9)                   OPTIONAL,    -- Need OP
   },                                                                OPTIONAL,    -- Need OP
   ...
}

DL-PRS-BeamInfoElement-r16 ::= SEQUENCE {
   -- Applicable per Resource ID of the Resource Set ID
   dl-PRS-Azimuth-r16               INTEGER (0..359),
   dl-PRS-Azimuth-fine-r16          INTEGER (0..9),
   dl-PRS-Elevation-r16             INTEGER (0..180)                 OPTIONAL,    -- Need ON
   dl-PRS-Elevation-fine-r16        INTEGER (0..9)                   OPTIONAL,    -- Need ON
   ...
}
```

FIG. 8

```
NR-AoD-MeasElement-r16 ::= SEQUENCE {
    -- Applicable per Resource Set or per TRP
    nr-AoD-PRS-Azimuth-r16          INTEGER (0..359),
    nr-AoD-Azimuth-fine-r16         INTEGER (0..9),    OPTIONAL,   -- Need ON
    nr-AoD-Elevation-r16            INTEGER (0..180)   OPTIONAL,   -- Need ON
    nr-AoD-Elevation-fine-r16       INTEGER (0..9)     OPTIONAL,   -- Need ON
    ...
}
```

METHODS FOR SIGNALING BEAM ANGULAR INFORMATION FOR UE-BASED POSITIONING

TECHNICAL FIELD

Embodiments of the present disclosure generally relate to wireless communication networks, and particularly relates to assisting wireless devices to determine their own positions based on information provided by a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the LTE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)— a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 0.5-ms slots. A 1-ms subframe includes two consecutive slots, each of which includes $N^{DL}_{symb}$ OFDM symbols comprised of $N_{sc}$ OFDM subcarriers. Similarly, each UL slot consists of $N^{UL}_{symb}$ OFDM symbols, each of which includes $N_{sc}$ OFDM subcarriers. A combination of a particular subcarrier in a particular symbol is known as a resource element (RE).

The LTE PHY maps various DL and UL physical channels to the resources described above. In general, a physical channel corresponds to a set of REs carrying information that originates from higher layers. Within the LTE DL and UL, certain REs within each LTE subframe are reserved for the transmission of reference signals. DL demodulation reference signals (DM-RS) are transmitted to aid the UE in the reception of an associated physical channel (e.g., PDCCH or PDSCH). Other DL reference signals include cell-specific reference signals (CRS), positioning reference signals (PRS), and CSI reference signals (CSI-RS). Other RS-like DL signals include Primary Synchronization Sequence (PSS) and Secondary Synchronization Sequence (SSS), which facilitate the UEs time and frequency synchronization and acquisition of system parameters (e.g., via PBCH). UL reference signals include DM-RS that are transmitted to aid the eNB in the reception of an associated physical channel (e.g., PUCCH or PUSCH); and sounding reference signals (SRS), which are not associated with any uplink channel.

3GPP standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device, the measuring node, and/or the positioning node to determine the location of the target device.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, NR DL and UL time-domain physical resources are organized into subframes, slots, and OFDM-based symbols. NR also uses many of the same physical channels as LTE. Additionally, the NR RRC layer includes RRC_IDLE and RRC_CONNECTED states, but adds an additional state known as RRC INACTIVE, which has some properties similar to a "suspended" condition used in LTE. In addition to providing coverage via cells, as in LTE, NR networks also provide coverage via "beams." In general, a DL "beam" is a coverage area of a network-transmitted RS that may be measured or monitored by a UE.

UE positioning is also expected to be an important feature for NR, which may include additional UE positioning use cases, scenarios, and/or applications. It is also expected the UE-based positioning will become more important for these new use cases, scenarios, and/or applications. In general, UE-based positioning refers to techniques in which the UE estimates its own position using one or more types of measurements based on assistance data provided by the network. However, the amount of assistance data needed to support UE-based positioning can be relatively large in some situations, such that delivering it in a timely manner via available network resources can be very costly and/or difficult. Accordingly, better techniques for provisioning assistance data are needed.

SUMMARY

Embodiments of the present disclosure provide specific improvements to positioning (e.g., determining the location) of user equipment (UEs) operating in a wireless network, such as by facilitating solutions to overcome exemplary problems summarized above and described in more detail below.

Some embodiments include methods (e.g., procedures) for providing angular positioning assistance data to one or more user equipment (UEs). These exemplary methods can be performed by a network node or function (e.g., E-SMLC, SLP, LMF, base station, eNB, gNB, ng-eNB, etc., or component thereof) in or associated with a wireless network.

These exemplary methods can include determining an angular resolution of angular positioning assistance data for each particular beam of a plurality of beams transmitted by one or more transmission reception points (TRPs) in the wireless network. These exemplary methods can also include transmitting, to one or more UEs, the angular positioning assistance data for the plurality of beams. For each particular beam, the angular positioning assistance data can include a first part having a first resolution and, when the determined angular resolution for the particular beam is greater than the first resolution, a second part having a second resolution that is greater (i.e., finer) than the first resolution.

In various embodiments, the angular positioning assistance data can be transmitted via unicast signaling from the network node to the one or more UEs or via broadcast in a cell of the wireless network.

In various embodiments, determining the angular resolution of the angular positioning assistance data for each particular beam can be based on one or more of the following:
  a degree of accuracy to which angular information for the particular beam is known by the network node;
  a number of beams comprising the plurality of beams; and
  one or more size constraints on messages used for delivery of the angular positioning assistance data.

In some embodiments, these exemplary methods can also include receiving, from a first UE, an indication of whether the first UE is capable of using angular positioning assistance data having the second resolution. In such embodiments, the angular positioning assistance data does not include the respective second parts when the indication indicates that the first UE is not capable of using angular positioning assistance data having the second resolution. If the indication indicates that the first UE is capable, the network node can determine the angular resolution of the angular positioning assistance data sent to the first UE based on other factors. In such embodiments, the network node can transmit the angular positioning assistance data to the first UE by unicast signaling, e.g., in response to the indication.

In some embodiments, the angular positioning assistance data for the plurality of beams can include respective azimuth angles and respective elevation angles. In such embodiments, the respective azimuth angles include respective first azimuth parts having the first resolution and the respective elevation angles include respective first elevation parts having the first resolution. In addition, when the determined angular resolution for a particular beam is greater than the first resolution, the azimuth angle for the particular beam includes a second azimuth part having the second resolution and the elevation angle for the particular beam includes a second elevation part having the second resolution.

In some of these embodiments, the angular positioning assistance data also includes a coordinate transformation for the respective azimuth angles and the respective elevation angles. In such embodiments, the coordinate transformation includes a first transformation part having the first resolution. In addition, when the determined angular resolution for at least one of the beams is greater than the first resolution, the coordinate transformation also includes a second transformation part having the second resolution.

In some embodiments, these exemplary methods can also include receiving one of the following from a first UE: an estimated position of the first UE, or angular measurements of at least a portion of the plurality of beams for which angular positioning assistance data was transmitted. In some embodiments, the angular measurements for each particular beam can include measured azimuth and elevation angles.

In some of these embodiments, the angular measurements for each measured beam can include the following:
  a first measurement part having a first measurement resolution (e.g., 1 degree); and
  when a resolution of the angular measurements for the measured beam is greater than the first measurement resolution, a second part having a second measurement resolution (e.g., 0.1 degree) that is greater than the first measurement resolution.

In some embodiments, these exemplary methods can also include estimating the UE's position based on the received angular measurements.

Other embodiments include methods (e.g., procedures) for positioning in a wireless network. These exemplary methods can be performed by a UE (e.g., wireless device, MTC device, NB-IoT device, modem, etc. or component thereof).

These exemplary methods can include receiving, from a network node (e.g., E-SMLC, LMF, etc.), angular positioning assistance data for a plurality of beams transmitted by one or more TRPs in the wireless network. For each particular beam, the angular positioning assistance data can include a first part having a first resolution and, when an angular resolution of the angular positioning assistance data for the particular beam is greater than the first resolution, a second part having a second resolution that is greater (i.e., finer) than the first resolution. These exemplary methods can also include determining angular configurations of the plurality of beams based on the angular positioning assistance data. These exemplary methods can also include performing angular measurements on at least a portion of the plurality of beams based on the determined angular configurations. In some embodiments, the angular measurements for each measured beam can include measured azimuth and elevation angles.

In some embodiments, when the angular positioning assistance data for a particular beam includes only the first part, the angular configuration for the particular beam can be determined according to the first resolution. Likewise, when the angular positioning assistance data for the particular beam includes the first part and the second part, the angular configuration for the particular beam is determined according to the second resolution.

In various embodiments, the angular positioning assistance data can be received via unicast signaling from the network node or via broadcast in a cell of the wireless network.

In some embodiments, these exemplary methods can also include transmitting, to the network node, an indication of whether the UE is capable of using angular positioning assistance data having the second resolution. In such embodiments, the angular positioning assistance data does not include the respective second parts when the indication indicates that the first UE is not capable of using angular positioning assistance data having the second resolution. If the indication indicates that the first UE is capable, the network node can determine the angular resolution of the angular positioning assistance data sent to the first UE based on other factors. In any event, the UE can receive the angular positioning assistance data via unicast signaling, e.g., in response to the indication.

In some embodiments, the angular positioning assistance data for the plurality of beams can include respective azimuth angles and respective elevation angles. In such embodiments, the respective azimuth angles include respective first azimuth parts having the first resolution and the respective elevation angles include respective first elevation parts having the first resolution. In addition, when the determined angular resolution for a particular beam is greater than the first resolution, the azimuth angle for the particular beam includes a second azimuth part having the second resolution and the elevation angle for the particular beam includes a second elevation part having the second resolution.

In some of these embodiments, the angular positioning assistance data can also include a coordinate transformation for the plurality of beams. In such embodiments, the determining operations can include applying the coordinate transformation to the respective azimuth angles and the respective elevation angles. In some of these embodiments, the coordinate transformation includes a first transformation part having the first resolution. Also, when an angular resolution for at least one of the beams is greater than the first resolution, the coordinate transformation also includes a second transformation part having the second resolution.

In some embodiments, these exemplary methods can also include determining a resolution of the angular measurements for the measured beam and transmitting the angular measurements to the network node. The transmitted angular measurements for each measured beam can include a first measurement part having a first measurement resolution (e.g., 1 degree) and, when the determined resolution of the angular measurements for the measured beam is greater than the first measurement resolution, a second part having a second measurement resolution (e.g., 0.1 degree) that is greater than the first measurement resolution.

In other embodiments, these exemplary methods can also include estimating the UE's (i.e., its own) position based on the performed angular measurements and transmitting the estimated position to the network node.

Other embodiments include network nodes or functions (e.g., E-SMLC, SLP, LMF, base station, eNB, gNB, ng-eNB, etc., or component thereof) and UEs (e.g., wireless devices, IoT devices, or components thereof) configured to perform operations corresponding to any of the exemplary methods described herein. Other embodiments include non-transitory, computer-readable media storing program instructions that, when executed by processing circuitry, configure such network nodes or functions and UEs to perform operations corresponding to various exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7 shows an ASN.1 data structure for an exemplary DL-PRS-Beam-Info-ResourceSet-r16 information element (IE) including beam angle assistance data for UE-based DL AoD positioning.

FIG. 8 shows an ASN.1 data structure for another exemplary DL-PRS-Beam-Info-ResourceSet-r16 IE, according to various exemplary embodiments of the present disclosure.

DETAILED DESCRIPTION

Figure 1:
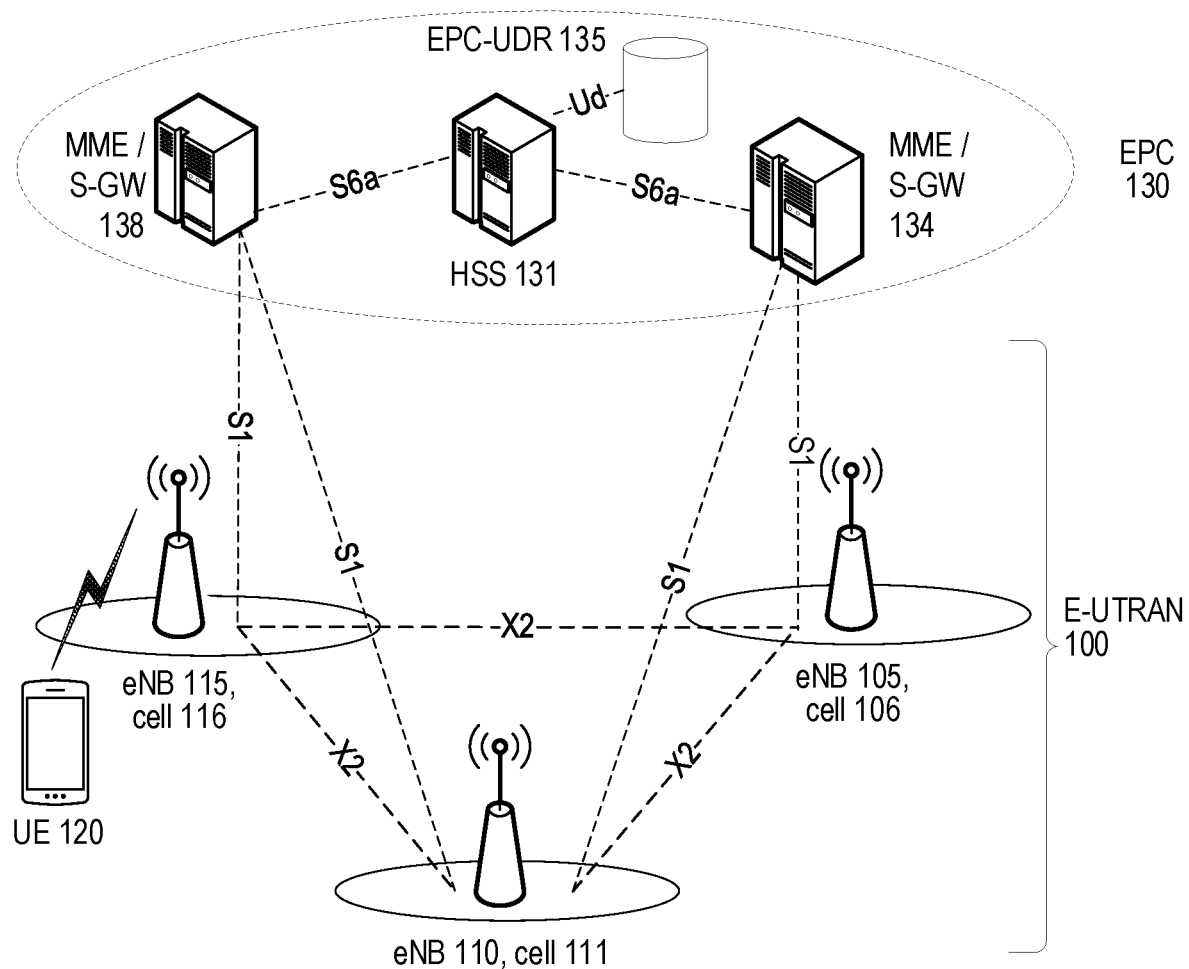
FIG. 1 is a high-level illustration of an exemplary architecture of the Long-Term Evolution (LTE) Evolved UTRAN (E-UTRAN) and Evolved Packet Core (EPC) network.
Figure 2:
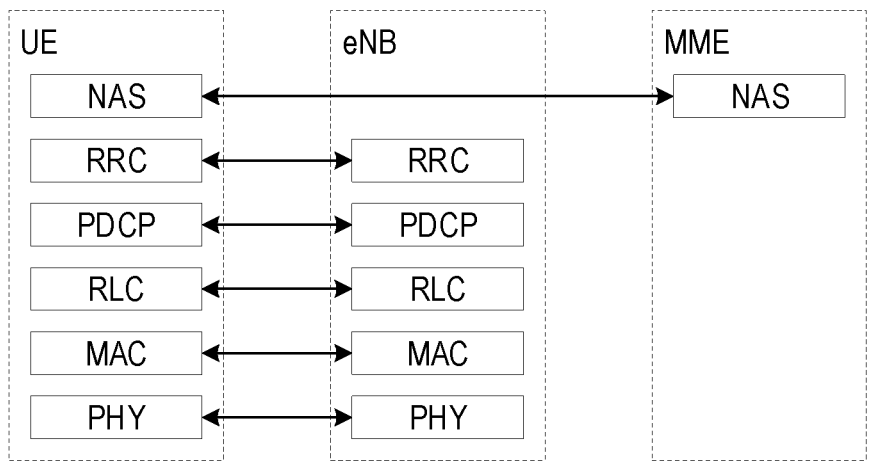
FIG. 2 shows exemplary control-plane (CP) protocol layers of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission point (TP), transmission/reception point (TRP), transmission nodes, Remote Radio Unit (RRU), Remote Radio Head (RRH), core network node (e.g., MME, SGW), core network function (e.g., AMF, LMF, etc.), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. A network node may also comprise test equipment.

The term "radio network node" can refer to any type of "network node" a radio access network (RAN) that operates to wirelessly transmit and/or receive signals. Radio network nodes can include any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH), an integrated access backhaul (IAB) node, a transmission point (TP), and a transmission/reception point (TRP). In addition, a location measurement unit (LMU), or equivalent positioning measurement node and/or functionality, is a type of radio network node.

In some embodiments, a TRP may be associated with a network node or radio network node. In some embodiments, a multi-TRP scenario may include more than one TRPs associated with one or more network nodes.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), USB dongles, mobile-type communication (MTC) devices, Internet-of-Things (IoT) devices, vehicle-mounted wireless terminal devices, ProSe UE, V2V UE, V2X UE, etc.

The term "radio node" (or simply "node") used herein may be used to also denote a wireless device (WD) such as a wireless device (WD) or a radio network node.

Unless otherwise noted, functions described herein as being performed by a UE, network node, radio network node, etc. can be distributed over a plurality of devices and/or network nodes. In other words, it is contemplated that the functions of the network node and UE described herein are not limited to performance by a single physical device and, in fact, can be distributed among several physical devices.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Although terminology from particular wireless systems (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

As briefly mentioned above, the amount of assistance data needed to support UE-based positioning can be relatively large in some situations, such that delivering it in a timely manner via available network resources can be very costly and/or difficult. Accordingly, better techniques for provisioning assistance data are needed. These issues are discussed in more detail below.

Figure 3:
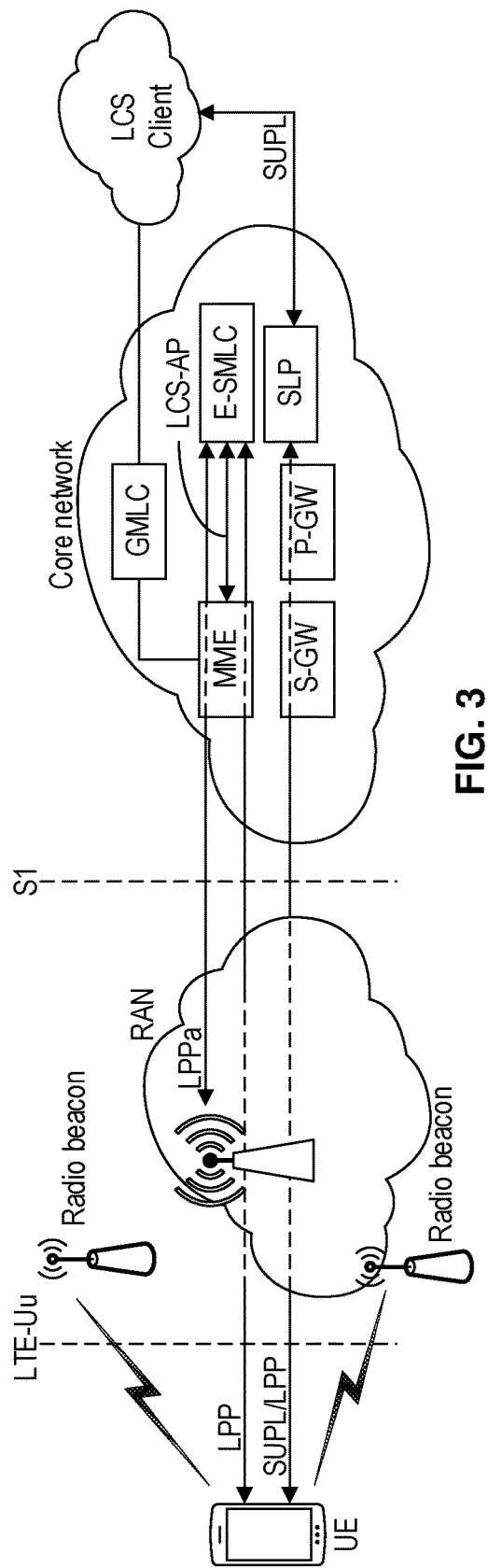
FIGS. 3-4 show two views of an exemplary positioning architecture for an LTE network.

FIG. 3 shows an exemplary positioning architecture within an LTE network. Three important functional elements of the LTE positioning architecture are the LCS Client, the LCS target and the LCS Server. The LCS Server is a physical or logical entity (e.g., as embodied by the E-SMLC or SLP in FIG. 3) managing positioning for an LCS target (e.g., as embodiments by the UE in FIG. 3) by collecting measurements and other location information, assisting the terminal in measurements when necessary, and estimating the LCS target location. An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE measurements, whilst the latter corresponds to the UE-based positioning mode. The following positioning methods are supported in LTE:
  Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).
  Assisted GNSS. GNSS information retrieved by the UE, supported by assistance information provided to the UE from the E-SMLC.
  OTDOA (Observed Time Difference of Arrival). The UE receives and measures Global Navigation Satellite System (GNSS) signals, supported by assistance information provided to the UE from E-SMLC.
  UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:
  UE-Assisted: The UE performs measurements with or without assistance from the network and sends these measurements to the E-SMLC where the position calculation may take place.
  UE-Based: The UE performs measurements and calculates its own position with assistance from the network.
  Standalone: The UE performs measurements and calculates its own position without network assistance.

The detailed assistance data may include information about network node locations, beam directions, etc. The assistance data can be provided to the UE via unicast or via broadcast.

Figure 4:
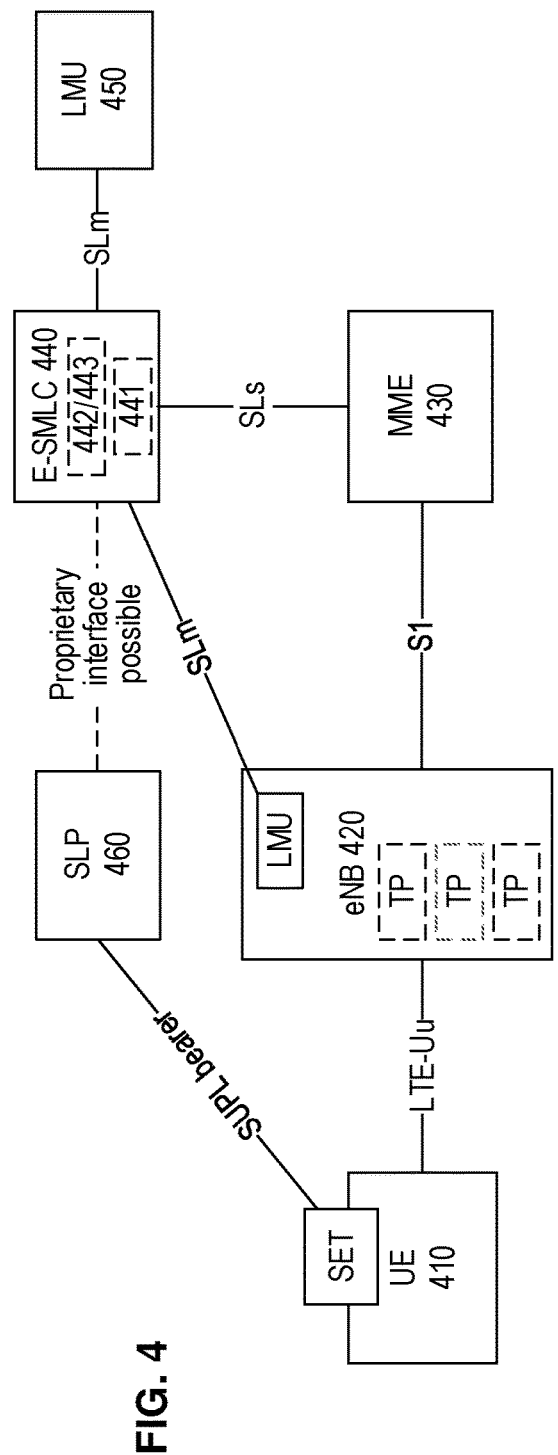

FIG. 4 shows another view of an exemplary positioning architecture in an LTE network. For example, FIG. 4 illustrates how secure user plane location (SUPL) techniques can be supported in LTE networks. In general, SUPL is run on top of the generic LTE user-plane protocol stack. The SUPL solution includes a location server—known as SUPL location platform, SLP (460)—that communicates with a SUPL-enabled terminal (SET), which can be software and/or hardware components of a UE. The SLP also may have a proprietary interface to the E-SMLC (440), which is the location server for control-plane positioning in LTE.

The E-SMLC can communicate with location measurement units (LMUs) via SLm interfaces. As shown in FIG. 4, LMUs can be standalone (e.g., LMU 450) or integrated with an eNB 420. An eNB also may include, or be associated with, one or more transmission points (TPs). The E-SMLC communicates to UEs (e.g., UE 410) via the serving MME (430) and eNB, using the respective SLs, S1, and Uu interfaces shown in FIG. 4. Although not shown, the RRC protocol is used to carry positioning-related information (e.g., to/from E-SMLC) between the UE and the eNB.

E-SMLC 440 can also include, or be associated with, various processing circuitry 442, by which the E-SMLC performs various operations described herein. Processing circuitry 442 can include similar types of processing circuitry as described herein in relation to other network nodes (see, e.g., description of FIG. 13). E-SMLC 440 can also include, or be associated with, a non-transitory computer-readable medium 443 storing instructions (also referred to as a computer program program) that can facilitate the operations of processing circuitry 442. Medium 443 can include similar types of computer memory as described herein in relation to other network nodes (see, e.g., description of FIG. 13). Additionally, E-SMLC 440 can include various communication interface circuitry 441, which can be used, e.g., for communication via the SLs interface. For example, communication interface circuitry 441 can be similar to other interface circuitry described herein in relation to other network nodes (see, e.g., description of FIG. 13).

Figure 5:
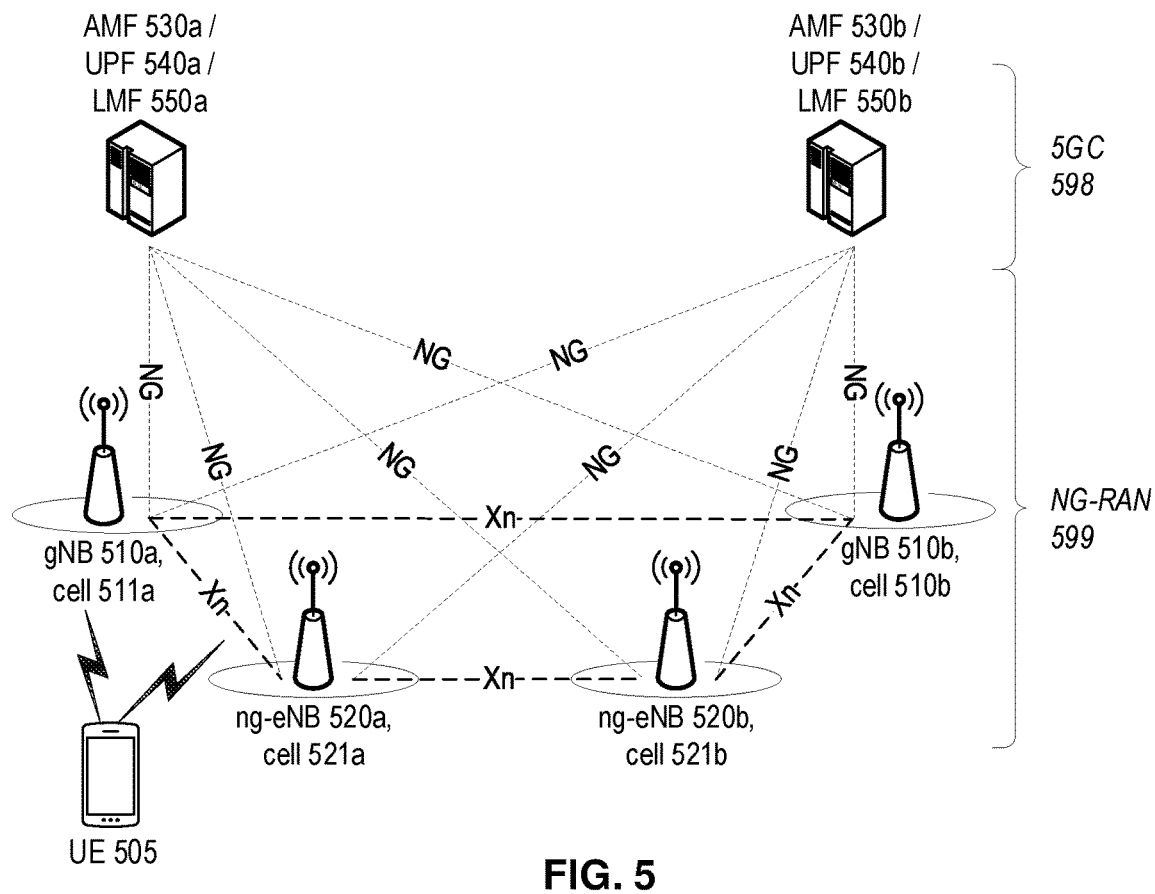
FIG. 5 illustrates a high-level view of a 5G/NR network architecture.

As mentioned above, positioning is also expected to be an important application in 5G/NR networks. FIG. 5 shows a high-level view of an exemplary 5G network architecture, including a Next Generation Radio Access Network (NG-RAN) 599 and a 5G Core (5GC) 598. As shown in the figure, NG-RAN 599 can include gNBs 510 (e.g., 510a,b) and ng-eNBs 520 (e.g., 520a,b) that are interconnected with each other via respective Xn interfaces. The gNBs and ng-eNBs are also connected via the NG interfaces to 5GC 598, more specifically to the AMF (Access and Mobility Management Function) 530 (e.g., AMFs 530a,b) via respective NG-C interfaces and to the UPF (User Plane Function) 540 (e.g., UPFs 540a,b) via respective NG-U interfaces. In some embodiments, 5GC 598 can also include one or more Location Management Functions (LMFs, e.g., LMF 550a, b), which are described in more detail below.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP can be applied, as defined in 3GPP TS 33.501.

Each of the gNBs 510a,b can support the NR radio interface, including frequency division duplexing (FDD), time division duplexing (TDD), or a combination thereof. In contrast, each of ng-eNBs 520a,b supports the LTE radio interface but, unlike conventional LTE eNBs (e.g., eNBs 105-115 shown in FIG. 1), connect to the 5GC via the NG interface.

Each of the gNBs and ng-eNBs can serve a geographic coverage area including one more cells, including exemplary cells 511a-b and 521a-b shown in FIG. 5. Depending on the particular cell in which it is located, a UE 505 can communicate with the gNB or ng-eNB serving that particular cell via the NR or LTE radio interface, respectively. In addition, the gNBs 510a,b and ng-eNBs 520a,b can provide multi-RAT (radio access technology) dual connectivity (MR-DC) to UEs.

The gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Each of the gNBs 510a,b can include a central (or centralized) unit (CU or gNB-CU) and one or more distributed (or decentralized) units (DU or gNB-DU). A CU connects to DUs over respective F1 logical interfaces. The CU and connected DUs are only visible to other gNBs and the 5GC as a gNB, e.g., the F1 interface is not visible beyond gNB-CU. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

CUs can host higher-layer protocols and perform various gNB functions such controlling the operation of DUs. For example, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and RRC. Likewise, DUs can host lower-layer protocols and can include various subsets of the gNB functions, depending on the functional split. For example, a DU can host lower-layer protocols such as RLC, MAC, and PHY.

Figure 6:
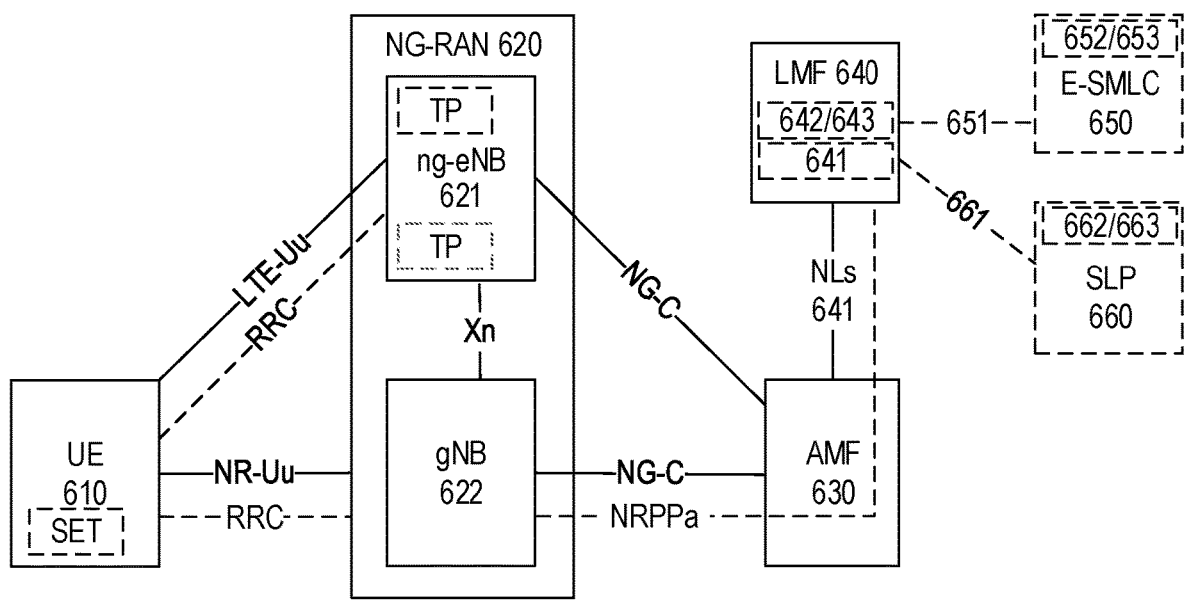
FIG. 6 shows an exemplary positioning architecture for a 5G/NR network.

FIG. 6 is a block diagram illustrating a high-level architecture for supporting UE positioning in NR networks. As shown in FIG. 6, the NG-RAN 620 can include nodes such as gNB 622 and ng-eNB 621, similar to the architecture shown in FIG. 4. Each ng-eNB may control several transmission points (TPs), such as remote radio heads. Moreover, some TPs can be "PRS-only" for supporting positioning reference signal (PRS)-based TBS for E-UTRAN operation.

In addition, the NG-RAN nodes communicate with an AMF 630 in the 5GC via respective NG-C interfaces (both of which may or may not be present), while AMF 630 and LMF 640 communicate via an NLs interface 641. In addition, positioning-related communication between UE 610 and the NG-RAN nodes occurs via the RRC protocol, while positioning-related communication between NG-RAN nodes and LMF occurs via an NRPPa protocol. Optionally, the LMF can also communicate with an E-SMLC 650 and a SUPL 660 in an LTE network via communication interfaces 651 and 661, respectively. Communication interfaces 651 and 661 can utilize and/or be based on standardized protocols, proprietary protocols, or a combination thereof.

LMF 640 can also include, or be associated with, various processing circuitry 642, by which the LMF performs various operations described herein. Processing circuitry 642 can include similar types of processing circuitry as described herein in relation to other network nodes (see, e.g., description of FIG. 13). LMF 640 can also include, or be associated with, a non-transitory computer-readable medium 643 storing instructions (also referred to as a computer program program) that can facilitate the operations of processing circuitry 642. Medium 643 can include similar types of computer memory as described herein in relation to other network nodes (see, e.g., description of FIG. 13). Additionally, LMF 640 can include various communication interface circuitry 641 (e.g., Ethernet, optical, and/or radio transceivers) that can be used, e.g., for communication via the NLs interface. For example, communication interface circuitry 641 can be similar to other interface circuitry described herein in relation to other network nodes (see, e.g., description of FIG. 13).

Similarly, E-SMLC 650 can also include, or be associated with, various processing circuitry 652, by which the E-SMLC performs various operations described herein. Processing circuitry 652 can include similar types of processing circuitry as described herein in relation to other network nodes (see, e.g., description of FIG. 13). E-SMLC 650 can also include, or be associated with, a non-transitory computer-readable medium 653 storing instructions (also referred to as a computer program program) that can facilitate the operations of processing circuitry 652. Medium 653 can include similar types of computer memory as described herein in relation to other network nodes (see, e.g., description of FIG. 13). E-SMLC 650 can also have communication interface circuitry that is appropriate for communicating via interface 651, which can be similar to other interface circuitry described herein in relation to other network nodes (see, e.g., description of FIG. 13).

Similarly, SLP 660 can also include, or be associated with, various processing circuitry 662, by which the SLP performs various operations described herein. Processing circuitry 662 can include similar types of processing circuitry as described herein in relation to other network nodes (see, e.g., description of FIG. 13). SLP 660 can also include, or be associated with, a non-transitory computer-readable medium 663 storing instructions (also referred to as a computer program program) that can facilitate the operations of processing circuitry 662. Medium 663 can include similar types of computer memory as described herein in relation to other network nodes (see, e.g., description of FIG. 13). SLP 660 can also have communication interface circuitry that is appropriate for communicating via interface 651, which can be similar to other interface circuitry described herein in relation to other network nodes (see, e.g., description of FIG. 13).

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR measurements. NR may also support one or more of the following position methods:

- Multi-RTT: The UE computes UE Rx-Tx time difference and gNBs compute gNB Rx-Tx time difference. The results are combined to find the UE position based upon round trip time (RTT) calculation.
- DL-AoD: gNB or LMF calculates the UE angular position based upon UE DL RSRP measurement results.
- UL-AoA: gNB calculates the UL AoA based upon measurements of a UE's UL SRS transmissions.

Each of the NR positioning methods can be supported in UE-assisted, UE-based or UE-standalone modes, similar to LTE discussed above. For UE-based positioning, a UE needs detailed assistance data including locations of any GNSS satellites and/or RAN nodes that are transmitting the signals being measured by the UE and, in some cases, the angles of beams carrying these signals. A detailed, high-accuracy 3D representation of the location of a transmitting RAN node can require almost 100 bits. Accurate beam angles can require approximately 30 bits per beam. With many network nodes and potentially many beams and frequent provisioning (e.g., via broadcast), the total cost of assistance data provisioning can become considerable.

The DL AoD positioning method involves UE measurements of reference signal received power (RSRP) of DL positioning reference signals (PRS) received from multiple transmission points (TRPs). The UE's measurements are facilitated by assistance data from the positioning server (e.g., LMF), and the resulting measurements are used along with other configuration information to determine the UE's position. The following assistance information can be sent from LMF to UE to support DL AoD positioning:

Physical cell IDs (PCIs), global cell IDs (GCIs), and TRP IDs of candidate NR TRPs for UE measurements;

Timing of candidate TRPs relative to the serving (reference) TRP;

DL PRS configuration for candidate TRPs;

SSB configuration of candidate TRPs (e.g., time/frequency occupancy of SSBs);

Geographical coordinates of candidate TRPs (e.g., transmission reference location for each DL-PRS Resource ID, reference location for transmitting antenna of reference TRP, relative locations for transmitting antennas of candidate TRPs, etc.); and Spatial direction information (e.g., azimuth, elevation, etc.) associated with DL-PRS Resources used by the candidate TRPs.

FIG. 7 shows an ASN.1 data structure for an exemplary DL-PRS-Beam-Info-ResourceSet-r16 information element (IE) including beam angle assistance data for UE-based DL AoD positioning. The DL-PRS-Beam-Info-ResourceSet-r16IE can be provided to a UE via an RRC message. As indicated in FIG. 7, the ASN.1 data structure is applicable for a single DL PRS Resource Set ID associated with a single TRP ID. The data structure includes up to 64 DL-PRS-BeamInfoElement-r16, each of which is associated with a single beam. Each DL-PRS-BeamInfoElement-r16 includes spatial directions for the associated beam. In particular, dl-PRS-Azimuth-r16 is given at a resolution of 0.1 degrees over a range of 0-360 degrees, while dl-PRS-Elevation-r16 is given at a resolution of 0.1 degrees over a range of 0-180 degrees. This requires roughly 30 bits per beam.

In addition, the ASN.1 data structure includes an lcs-To-Gcs-Translation element with three angular factors that facilitate a translation of the provided beam spatial directions to a global coordinate system (GCS). In particular, alpha represents a bearing angle, beta represents a downtilt angle, and gamma represents a slant angle. Each is given at a resolution of 0.1 degrees over a range of 0-360 degrees. This translation information requires approximately 23 additional bits per DL-PRS-Beam-Info-ResourceSet-r16 IE.

In total, the assistance data for the UE can include up to up to 256 different TRP IDs and up to eight (8) DL PRS Resource Set IDs can be associated with each TRP ID. As a worst case, then, the assistance data can include up to 2048 DL-PRS-Beam-Info-ResourceSet-r16 IEs, each of which can include up to 64 DL-PRS-BeamInfoElement-r16 elements with azimuth and elevation angles. Given the size of individual fields, the assistance data for this worst case is extremely large. But even neglecting this worst case, the size of the assistance data can be quite large even for more common cases involving fewer TRP IDs, fewer DL PRS Resource Set IDs per TRP, and/or fewer beams per resource set. Such large sizes of assistance data can be particularly problematic for broadcast provisioning of the DL AoD assistance data, which can involve more limited network resources. Furthermore, size-related problems can also affect the UE's reporting of DL AoD measurements to the network, particularly if the UE has measured a relatively large number of beams indicated by the received assistance data.

Embodiments of the present disclosure can address these and other issues, problems, and/or difficulties by providing novel techniques for a network node (e.g., LMF) to provide angular positioning assistance data (e.g., azimuth, elevation, etc.) to a UE by a combination of two parts—a first part having a first angular resolution and a second part having a second angular resolution that is greater than the first angular resolution (i.e., finer angular granularity). The second part can be included optionally on a beam-by-beam basis. For example, by separating the information first and optional second parts, the provisioning of finer-granularity angular positioning assistance can be restricted to beams for which the network knows the angular information to a corresponding high degree of accuracy. For other beams, the network can provide only the first part having the coarser angular resolution.

Other embodiments include techniques for a UE to provide a network node with angular measurements of various beams transmitted by various TRPs. In particular, the UE can provide angular positioning measurements (e.g., azimuth, elevation, etc.) to the network node by a combination of two parts—a first part having a first angular resolution and a second part having a second angular resolution that is greater than the first angular resolution (i.e., finer angular granularity). The second part can be included optionally on a beam-by-beam basis.

In this manner, embodiments of the present disclosure can provide various advantages, benefits, and/or solutions to problems. For example, such techniques improve the efficiency of provisioning positioning assistance data, e.g., by reducing the signaling overhead/cost for individual and/or periodic assistance data provisioning transactions via unicast or broadcast. Conversely, given a budget or amount of signaling resources available, such techniques can increase the number of individual transactions, the frequency of periodic transactions (e.g., broadcast), and/or the amount of assistance data in each transaction. Such improvements can facilitate better availability of positioning assistance data to UEs, which in turn can facilitate increased use of UE-based positioning for various applications, use cases, and/or scenarios.

FIG. 8 shows an ASN.1 data structure for an exemplary DL-PRS-Beam-Info-ResourceSet-r16 IE, according to various exemplary embodiments of the present disclosure. Similar to the ASN.1 data structure shown in FIG. 7, the DL-PRS-Beam-Info-ResourceSet-r16 IE shown in FIG. 8 includes up to 64 DL-PRS-BeamInfoElement-r16 fields, each including spatial directions for the associated beam.

In particular, dl-PRS-Azimuth-r16 is given at a resolution of 1 degree over a range of 0-359 degrees, while dl-PRS-Elevation-r16 is given at a resolution of 1 degree over a range of 0-180 degrees. This requires approximately 17 bits per beam. In addition, dl-PRS-Azimuth-fine-r16 is given at a resolution of 0.1 degree over a range of 0-0.9 degrees, while dl-PRS-Elevation-fine-r16 is given at a resolution of 0.1 degree over a range of 0-0.9 degrees. This requires approximately eight (8) bits per beam.

However, the two latter fields are optional and can be included by the network when desirable and/or required. When included, the actual azimuth angle of the associated beam is determined based on the sum of dl-PRS-Azimuth-r16 and dl-PRS-Azimuth-fine-r16. When not included, the actual azimuth angle of the associated beam is determined based on dl-PRS-Azimuth-r16 alone. A corresponding determination can be made for the actual elevation angle of the associated beam. The non-inclusion of the latter two fields reduces the size of the assistance data for each beam by eight bits.

Similar to FIG. 7, the ASN.1 data structure shown in FIG. 8 also includes an lcs-To-Gcs-Translation element with three angular factors that facilitate a translation of the provided beam spatial directions to a GCS. In particular, alpha, beta, and gamma are each given at a resolution of 1 degree over a range of 0-359 degrees. This requires approximately 27 bits per beam set. In addition, alpha-fine, beta-fine, and gamma-fine are each given at a resolution of 0.1 degree over a range of 0-0.9 degrees. This requires approximately 12 bits per beam set.

However, the three latter fields are optional and can be included by the network when desired and/or required. When included, the actual bearing angle of the translation is determined based on the sum of alpha and alpha-fine. When not included, the actual bearing angle of the translation is determined based on alpha alone. Corresponding determinations can be made for the actual downtilt (beta) and slant (gamma) angles of the translation. The non-inclusion of the latter three fields reduces the size of the assistance data for each beam set by 12 bits.

In the context of the previous discussion, the parameters dl-PRS-Azimuth-r16, dl-PRS-Elevation-r16, alpha, beta, and gamma are elements of a first part of the angular positioning assistance data having a first resolution. Likewise, the parameters dl-PRS-Azimuth-fine-r16, dl-16, alpha-fine, beta-fine, and gamma-fine are elements of a second part of the angular positioning assistance data having a second resolution that is greater than the first angular resolution (i.e., finer angular granularity). In this example, the first angular resolution is 1 degree and the second angular resolution is 0.1 degree.

In some embodiments, the network node can determine whether to include the parameters dl-PRS-Azimuth-fine-r16, dl-PRS-Elevation-fine-r16, alpha-fine, beta-fine, and/or gamma-fine based on the degree of accuracy to which the network knows the angular information. In some embodiments, the network node can determine whether to include the finer-resolution parameters based on the number and the size of DL-PRS-Beam-Info-ResourceSet-r16 IEs to be provided (e.g., number of TRPs, number of resource sets per TRP, number of beams, etc.) and one or more constraints on the size of one or more messages in which the DL-PRS-Beam-Info-ResourceSet-r16 IEs will be provided. For other beams, the network can provide only the first part having the coarser angular resolution. The network node can make this determination on a beam-by-beam, resource set-by-resource set, and/or TRP-by-TRP basis.

In some embodiments, the network node can determine whether to include the second part having the second resolution based on UE capabilities. In such embodiments, a UE can send, to the network node, an indication of the UE's capability for utilizing angular positioning assistance data having the second resolution (e.g., dl-PRS-Azimuth-fine-r16, dl-PRS-Elevation-fine-r16, alpha-fine, beta-fine, and gamma-fine). When the UE indicates that it does not support the second part and/or the finer second resolution, the network node can refrain from including the second part. When the UE indicates that it does support the second part and/or the second resolution, the network node can either include the second part or make the determination whether to include the second part based on any of the other factors discussed above. Note that these embodiments are particularly applicable to unicast and/or dedicated signaling of the angular positioning assistance data from the network node and to individual UEs, whereas other embodiments that do not rely on UE-specific capabilities may be more applicable to broadcast of the angular positioning assistance data.

Accordingly, after obtaining the angular positioning assistance data for a plurality of beams (e.g., in DL-PRS-Beam-Info-ResourceSet-r16 IEs) by broadcast or unicast signaling, the UE can determine angular configurations for the respective beams based on the assistance data, and measure beam signal characteristics for at least a portion of the beams based on the determined angular configurations. In some embodiments, the UE can also estimate its position based on the determined angular configurations and the measured signal characteristics. If the assistance data for the measured beams includes the second part with the second resolution, this can facilitate a UE position estimate with increased accuracy. In some embodiments, the UE can send the estimated position to the network node.

As mentioned above, size-related problems can also affect the UE's reporting of DL AoD measurements to the network, particularly if the UE has measured a relatively large number of beams indicated by the received assistance data. Accordingly, in some embodiments, a UE can provide a network node with angular measurements (e.g., azimuth, elevation, etc.) of various beams transmitted by various TRPs, by a combination of two parts—a first part having a first angular resolution and a second part having a second angular resolution that is greater than the first angular resolution (i.e., finer angular granularity). The second part can be included optionally on a beam-by-beam basis. The inclusion of the respective measurements can be based on the same factors discussed above, e.g., level of accuracy of the measurements known to the UE, number of beams measured, and/or size constraints of messages for reporting measurements.

Figures 9, 10:
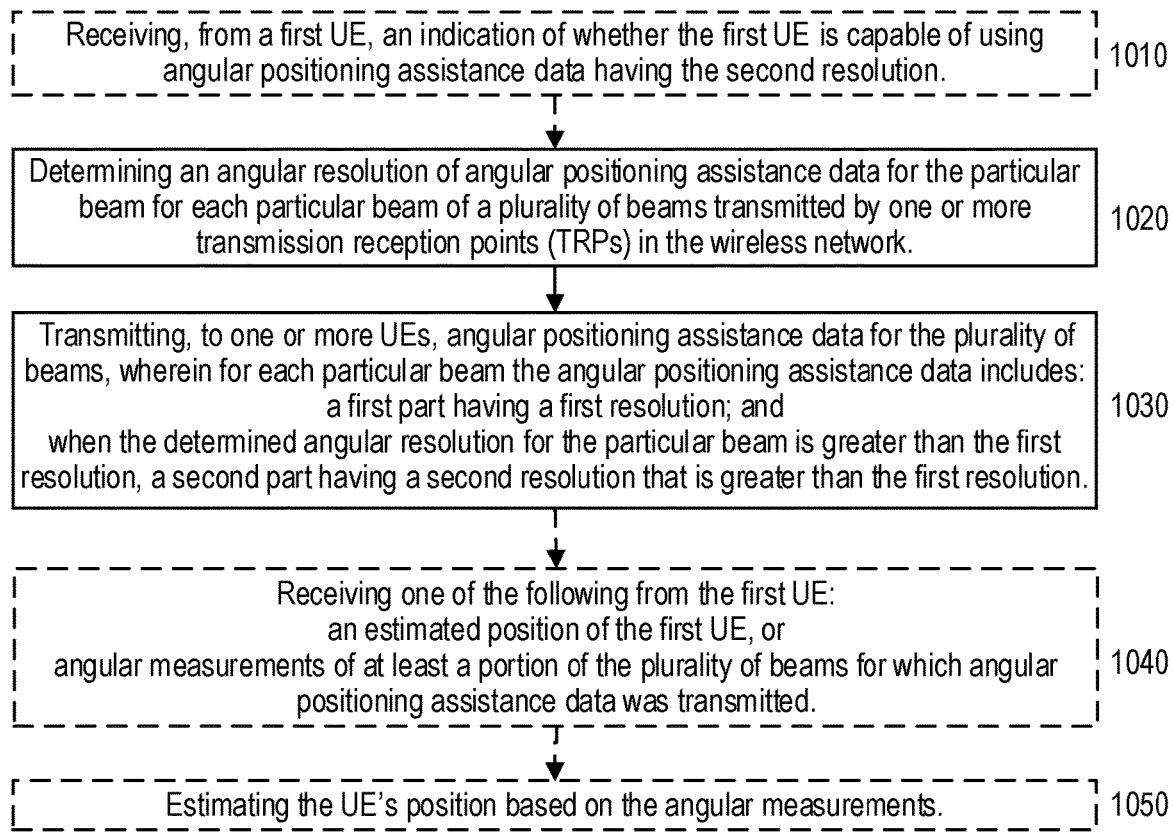
FIG. 9 shows an ASN.1 data structure for an exemplary NR-AoD-MeasElement-r16 IE, according to various embodiments of the present disclosure.
FIG. 10 shows a flow diagram of an exemplary method (e.g., procedure) for a network node (e.g., E-SMLC, LMF, etc.), according to various exemplary embodiments of the present disclosure.

FIG. 9 shows an ASN.1 data structure for an exemplary NR-AoD-MeasElement-r16 IE, according to various embodiments of the present disclosure. The exemplary IE shown in FIG. 9 can be used by a UE to provide angular measurements (e.g., azimuth and elevation) for a single beam to a network node. Multiple instances of the IE shown in FIG. 9 can be used to provide measurements for multiple beams.

In particular, nr-AoD-Azimuth-r16 is a beam azimuth measurement given at a resolution of 1 degree over a range of 0-359 degrees, while nr-AoD-Elevation-r16 is a beam elevation measurement given at a resolution of 1 degree over a range of 0-180 degrees. This requires approximately 17 bits per beam. In addition, nr-AoD-Azimuth-fine-r16 is given at a resolution of 0.1 degree over a range of 0-0.9 degrees, while nr-AoD-Elevation-fine-r16 is given at a resolution of 0.1 degree over a range of 0-0.9 degrees. This requires approximately eight (8) bits per beam.

However, the two latter fields are optional and can be included by the network when desirable and/or required. When included, the measured azimuth angle of the associated beam can be determined based on the sum of nr-AoD-Azimuth-r16 and nr-AoD-Azimuth-fine-r16. When not included, the measured azimuth angle of the associated beam can be determined based on nr-AoD-Azimuth-r16 alone. A corresponding determination can be made for the measured elevation angle of the associated beam. The non-inclusion of the latter two fields reduces the size of the angular measurements for each beam by eight bits.

Although the examples shown in FIGS. 8-9 are based on beam angle resolutions in units of degrees, skilled persons will recognize that equivalent beam angle resolutions can be expressed in units of radians. Moreover, the angular resolutions of 1 and 0.1 degrees used in FIGS. 8-9 are exemplary and other resolutions can be used in different embodiments.

Figure 11:
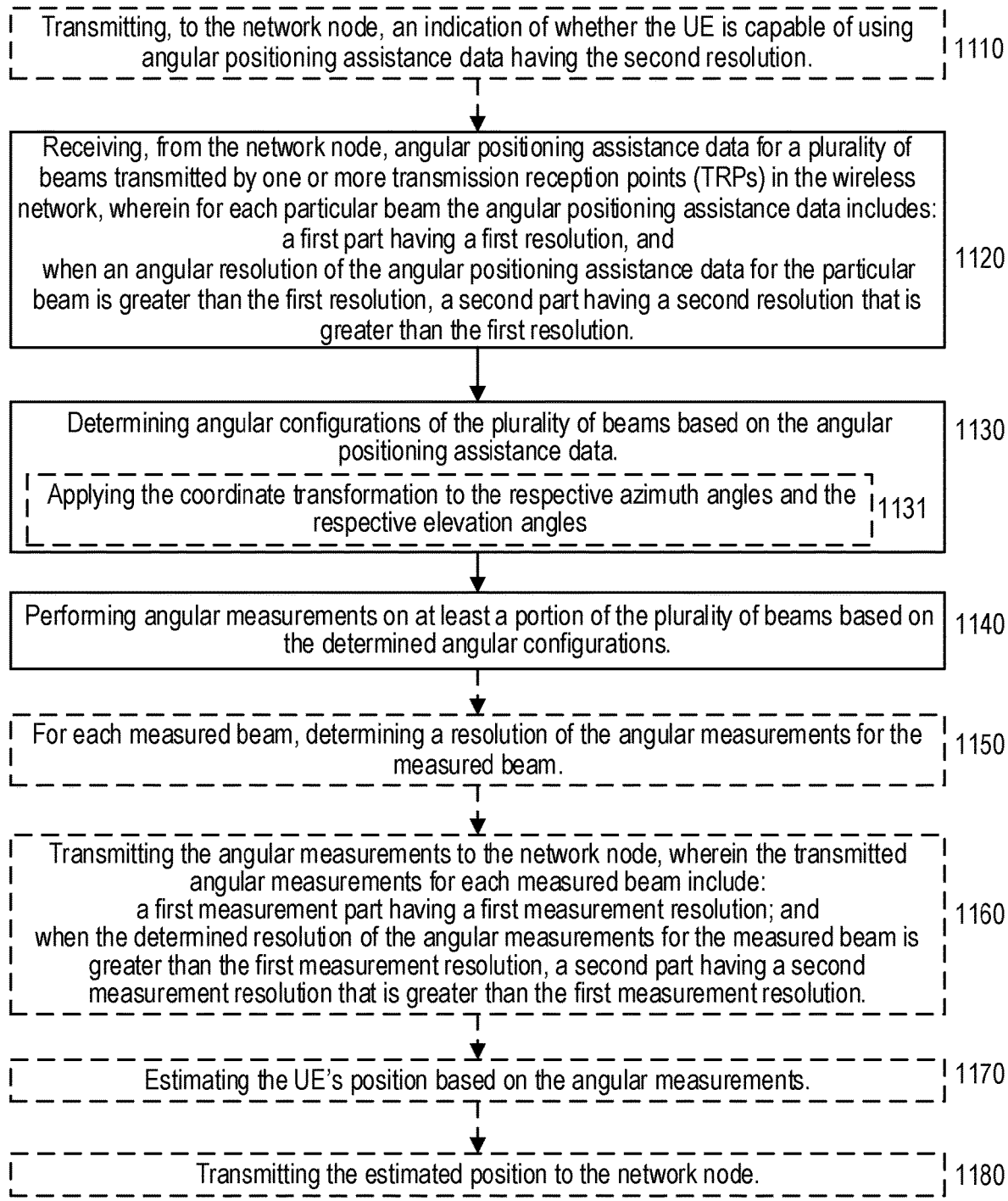
FIG. 11 shows a flow diagram of an exemplary method (e.g., procedure) for a UE (e.g., wireless device), according to various exemplary embodiments of the present disclosure.

The embodiments described above can be further illustrated with reference to FIGS. 10-11, which depict exemplary methods (e.g., procedures) for a network node or function and a UE, respectively. Put differently, various features of the operations described below correspond to various embodiments described above. Furthermore, the exemplary methods shown in FIGS. 10-11 can be used cooperatively to provide various benefits, advantages, and/or solutions to problems, including those described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows a flow diagram of an exemplary method (e.g., procedure) for providing positioning assistance data to one or more user equipment (UEs) in a wireless network, according to various exemplary embodiments of the present disclosure. The exemplary method can be performed by a network node or function (e.g., E-SMLC, SLP, LMF, base station, eNB, gNB, ng-eNB, etc., or component thereof) in or associated with the wireless network. For example, the exemplary method shown in FIG. 10 can be implemented in a network node or function configured according to other figures described herein.

The exemplary method can include the operations of block 1020, where the network node can determine an angular resolution of angular positioning assistance data for each particular beam of a plurality of beams transmitted by one or more transmission reception points (TRPs) in the wireless network. The exemplary method can also include the operations of block 1030, where the network node can transmit, to one or more UEs, the angular positioning assistance data for the plurality of beams. For each particular beam, the angular positioning assistance data can include a first part having a first resolution (e.g., 1 degree as discussed above) and, when the determined angular resolution for the particular beam is greater than the first resolution, a second part having a second resolution (e.g., 0.1 degree as discussed above) that is greater than the first resolution.

In various embodiments, the angular positioning assistance data can be transmitted (e.g., in block 1030) via unicast signaling from the network node to the one or more UEs or via broadcast in a cell of the wireless network. For example, if the network node is a positioning node (e.g., E-SMLC, LMF), the network node can provide the angular positioning assistance data to a base station (e.g., eNB, gNB) for broadcasting as SI in one of more cells served by the base station.

In various embodiments, determining the angular resolution of angular positioning assistance data for each particular beam (e.g., in block 1020) can be based on one or more of the following:
  a degree of accuracy to which angular information for the particular beam is known by the network node;
  a number of beams comprising the plurality of beams; and
  one or more size constraints on messages used for delivery of the angular positioning assistance data.

In some embodiments, the exemplary method can also include the operations of block 1010, where the network node can receive, from a first UE, an indication of whether the first UE is capable of using angular positioning assistance data having the second resolution. In such embodiments, the angular positioning assistance data does not include the respective second parts when the indication indicates that the first UE is not capable of using angular positioning assistance data having the second resolution. If the indication in block 1010 indicates that the first UE is capable, the network node can determine the angular resolution of the angular positioning assistance data sent to the first UE based on other factors, including those described above. In any event, the network node can transmit the angular positioning assistance data to the first UE by unicast signaling, e.g., in response to the indication.

In some embodiments, the angular positioning assistance data for the plurality of beams can include respective azimuth angles and respective elevation angles. In such embodiments, the respective azimuth angles include respective first azimuth parts having the first resolution and the respective elevation angles include respective first elevation parts having the first resolution. In addition, when the determined angular resolution for a particular beam is greater than the first resolution, the azimuth angle for the particular beam includes a second azimuth part having the second resolution and the elevation angle for the particular beam includes a second elevation part having the second resolution. An example of such embodiments is illustrated in FIG. 8.

In some of these embodiments, the angular positioning assistance data also includes a coordinate transformation for the respective azimuth angles and the respective elevation angles. In such embodiments, the coordinate transformation includes a first transformation part having the first resolution. In addition, when the determined angular resolution for at least one of the beams is greater than the first resolution, the coordinate transformation also includes a second transformation part having the second resolution. An example of such embodiments is illustrated in FIG. 8.

In some embodiments, the exemplary method can also include the operations of block 1040, where the network node can receive one of the following from a first UE (e.g., the first UE from which the indication was received in block 1010): an estimated position of the first UE, or angular measurements of at least a portion of the plurality of beams for which angular positioning assistance data was transmitted. In some embodiments, the angular measurements for each measured beam can include a measured azimuth angle and a measured elevation angle.

In some of these embodiments, the angular measurements for each measured beam can include the following:
  a first measurement part having a first measurement resolution (e.g., 1 degree, as discussed above); and
  when a resolution of the angular measurements for the measured beam is greater than the first measurement resolution, a second part having a second measurement resolution (e.g., 0.1 degree as discussed above) that is greater than the first measurement resolution.
An example of such embodiments is illustrated in FIG. 9.

In some embodiments, the exemplary method can also include the operations of block 1050, where the network node can estimate the UE's position based on the angular measurements (e.g., received in block 1040).

In addition, FIG. 11 shows a flow diagram of an exemplary method (e.g., procedure) for positioning in a wireless network, according to various exemplary embodiments of the present disclosure. The exemplary method can be performed by a UE (e.g., wireless device, MTC device, NB-IoT device, modem, etc. or component thereof), such as UEs configured according to other figures described herein.

The exemplary method can include the operations of block 1120, where the UE can receive, from a network node (e.g., E-SMLC, LMF, etc.), angular positioning assistance data for a plurality of beams transmitted by one or more TRPs in the wireless network. For each particular beam, the angular positioning assistance data can include a first part having a first resolution (e.g., 1 degree as discussed above) and, when an angular resolution of the angular positioning assistance data for the particular beam is greater than the first resolution, a second part having a second resolution (e.g., 0.1 degree as discussed above) that is greater than the first resolution. The exemplary method can also include the operations of block 1130, where the UE can determine angular configurations of the plurality of beams based on the angular positioning assistance data. The exemplary method can also include the operations of block 1140, where the UE can perform angular measurements on at least a portion of the plurality of beams based on the determined angular configurations. In some embodiments, the angular measurements for each measured beam can include measured azimuth and elevation angles.

In some embodiments, when the angular positioning assistance data for a particular beam includes only the first part, the angular configuration for the particular beam is determined (e.g., in block 1130) according to the first resolution. Likewise, when the angular positioning assistance data for the particular beam includes the first part and the second part, the angular configuration for the particular beam is determined according to the second resolution.

In various embodiments, the angular positioning assistance data can be received (e.g., in block 1120) via unicast signaling from the network node or via broadcast in a cell of the wireless network. For example, if the network node is a positioning node (e.g., E-SMLC, LMF), the network node can provide the angular positioning assistance data to a base station (e.g., eNB, gNB) for broadcasting as SI in one of more cells served by the base station.

In some embodiments, the exemplary method can also include the operations of block 1110, where the UE can transmit, to the network node, an indication of whether the UE is capable of using angular positioning assistance data having the second resolution. In such embodiments, the angular positioning assistance data does not include the respective second parts when the indication indicates that the first UE is not capable of using angular positioning assistance data having the second resolution. If the indication in block 1110 indicates that the first UE is capable, the network node can determine the angular resolution of the angular positioning assistance data sent to the first UE based on other factors, including those described above. In any event, the UE can receive the angular positioning assistance data via unicast signaling, e.g., in response to the indication.

In some embodiments, the angular positioning assistance data for the plurality of beams includes respective azimuth angles and respective elevation angles. In such embodiments, the respective azimuth angles include respective first azimuth parts having the first resolution and the respective elevation angles include respective first elevation parts having the first resolution. In addition, when the determined angular resolution for a particular beam is greater than the first resolution, the azimuth angle for the particular beam includes a second azimuth part having the second resolution and the elevation angle for the particular beam includes a second elevation part having the second resolution. An example of such embodiments is illustrated in FIG. 8.

In some of these embodiments, the angular positioning assistance data can also include a coordinate transformation for the plurality of beams. In such embodiments, the determining operations of block 1130 can include the operations of sub-block 1131, where the UE can apply the coordinate transformation to the respective azimuth angles and the respective elevation angles. In some of these embodiments, the coordinate transformation includes a first transformation part having the first resolution. Also, when an angular resolution for at least one of the beams is greater than the first resolution, the coordinate transformation also includes a second transformation part having the second resolution. An example of such embodiments is illustrated in FIG. 8.

In some embodiments, the exemplary method can also include the operations of blocks 1150-1160. In block 1150, the UE can, for each measured beam, determine a resolution of the angular measurements for the measured beam. In block 1160, the UE can transmit the angular measurements to the network node. The transmitted angular measurements for each measured beam can include a first measurement part having a first measurement resolution (e.g., 1 degree) and, when the determined resolution of the angular measurements for the measured beam is greater than the first measurement resolution, a second part having a second measurement resolution (e.g., 0.1 degree) that is greater than the first measurement resolution. An example of such embodiments is illustrated in FIG. 9.

In other embodiments, the exemplary method can also include the operations of blocks 1170-1180. In block 1170, the UE can estimate the UE's (i.e., its own) position based on the angular measurements (e.g., performed in block 1140). In block 1180, the UE can transmit the estimated position to the network node.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
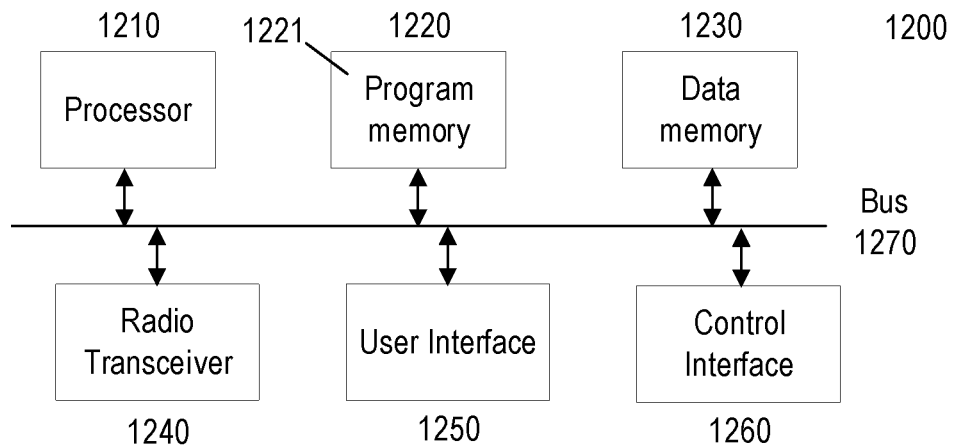
FIG. 12 is a block diagram of an exemplary wireless device or UE according to various exemplary embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods described herein.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1221 in FIG. 12) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some exemplary embodiments, the radio transceiver 1240 includes one or more transmitters and one or more receivers that enable UE 1200 to communicate according to various protocols and/or methods proposed for standardization by 3GPP and/or other standards-setting organizations (SSOs). For example, such functionality can operate cooperatively with processor 1210 to implement a PHY layer based on OFDM, OFDMA, and/or SC-FDMA technologies, such as described herein with respect to other figures.

In some exemplary embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some exemplary embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible devices.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200, or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many exemplary embodiments of the UE 1200 having a touch screen display are capable of receiving user inputs, such as inputs related to exemplary methods described herein or otherwise known to persons of ordinary skill.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the UE. In this exemplary manner, the application program can maintain the screen display in a manner that is readable by the user, regardless of the physical orientation of the UE. In addition, the output of the orientation sensor can be used in conjunction with various exemplary embodiments of the present disclosure.

A control interface 1260 of the UE 1200 can take various forms depending on the particular exemplary embodiment of UE 1200 and of the particular interface requirements of other devices that the UE 1200 is intended to communicate with and/or control. For example, the control interface 1260 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including any program code corresponding to and/or embodying any exemplary embodiments (e.g., of methods) described herein.

Figure 13:
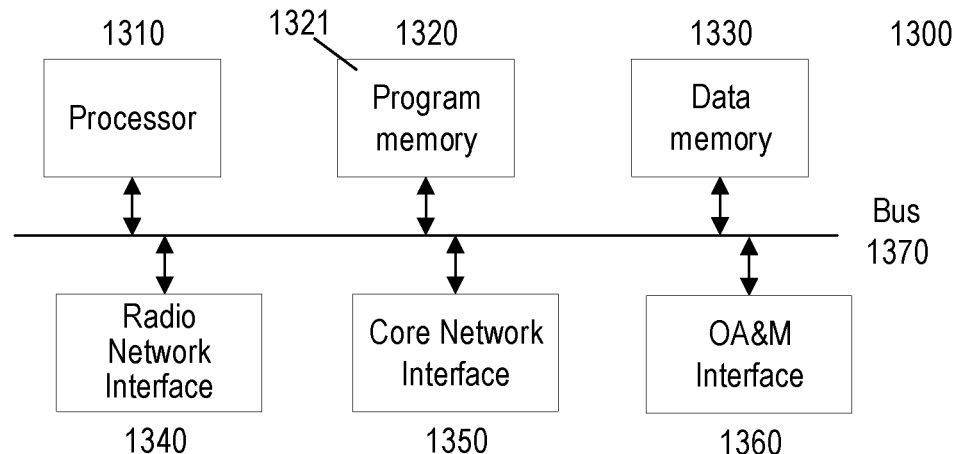
FIG. 13 is a block diagram of an exemplary network node according to various exemplary embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods described herein. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product 1321 in FIG. 13) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some exemplary embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN (also referred to as a "wireless network"), such as with other eNBs, gNBs, ng-eNBs, en-gNBs, IAB nodes, etc. Such hardware and/or software can be part of radio network interface 1340 and/or core network interface 1350, or it can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
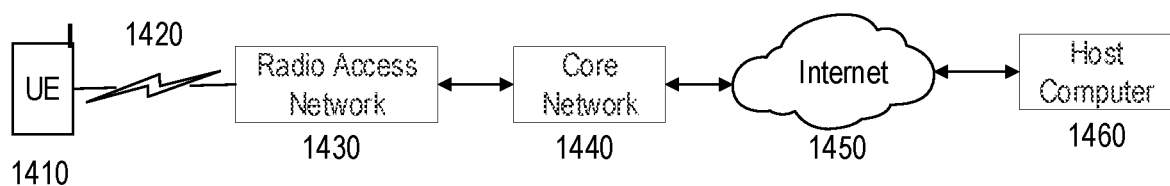
FIG. 14 is a block diagram of an exemplary network configured to provide over-the-top (OTT) data services between a host computer and a UE, according to various exemplary embodiments of the present disclosure.

FIG. 14 is a block diagram of an exemplary communication network configured to provide over-the-top (OTT) data services between a host computer and a user equipment (UE), according to various exemplary embodiments of the present disclosure. UE 1410 can communicate with radio access network (RAN, also referred to as "wireless network") 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some exemplary embodiments, RAN 1430 and core network 1440 can be configured and/or arranged as shown in other figures discussed above. For example, eNBs comprising an E-UTRAN 1430 can communicate with an EPC core network 1440 via an S1 interface. As another example, gNBs and ng-eNBs comprising an NG-RAN 1430 can communicate with a 5GC core network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide novel techniques for providing positioning assistance information that facilitate UE-based estimates of position, e.g., based on measurements of signals transmitted or received by TRPs in the wireless network. Such techniques can facilitate more accurate and/or more timely location estimates by UEs, as well as reduced network signaling complexity, as described above. Such advantages can be very important in certain applications, such as high-precision/high-accuracy positioning and/or low-complexity positioning. When used in NR UEs (e.g., UE 1410) and gNBs (e.g., gNBs comprising RAN 1430), exemplary embodiments described herein can provide various improvements, benefits, and/or advantages that facilitate the use of location-based OTT services. As a consequence, this improves the performance of these services as experienced by OTT service providers and end-users, including more precise delivery of services with lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some to implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties. Embodiments of the techniques and apparatus described herein also include, but are not limited to, the following enumerated examples:

E1. A method, performed by a network node in a wireless network, for providing angular positioning assistance data to one or more user equipment (UEs), the method comprising:
  for each particular beam of a plurality of beams transmitted by one or more transmission reception points (TRPs), determining an angular resolution of angular positioning assistance data for the particular beam; and
  transmitting, to one or more UEs, the angular positioning assistance data for the plurality of beams, wherein for each particular beam the angular positioning assistance data includes:
    a first part having a first resolution; and
    when the determined angular resolution for the particular beam is greater than the first resolution, a second part having a second resolution that is greater than the first resolution.

E2. The method of embodiment E1, wherein the angular positioning assistance data is transmitted according to one of the following:
  via unicast signaling from the network node to the one or more UEs; or
  broadcast in a cell of the wireless network.

E3. The method of any of embodiments E1-E2, wherein determining the angular resolution of angular positioning assistance data for each particular beam is based on one or more of the following:
  a degree of accuracy to which angular information for the particular beam is known by the network node;
  a number of beams comprising the plurality of beams; and
  one or more size constraints on messages used for delivery of the angular positioning assistance data.

E4. The method of any of embodiments E1-E3, wherein:
  the method further comprises receiving, from a first UE, an indication of the first UE's capability for utilizing the second part having the second resolution;
  determining the angular resolution of the angular positioning assistance data is based on the indication; and
  the angular positioning assistance data is transmitted to the first UE by unicast signaling.

E5. The method of any of embodiments E1-E4, wherein:
  the angular positioning assistance data includes azimuth and elevation angles for each particular beam; and
  each azimuth or elevation angle includes a first azimuth or elevation part having the first resolution; and
  when the determined angular resolution for a particular beam is greater than the first resolution, the azimuth and elevation angles for the particular beam include respective combinations of the first azimuth and elevation parts with second azimuth and elevation parts having the second resolution.

E6. The method of any of embodiments E1-E5, wherein:
the angular positioning assistance data also includes a coordinate transformation for the plurality of beams;
the coordinate transformation includes a first transformation part having the first resolution; and
when the determined angular resolution for any of the beams is greater than the first resolution, the coordinate transformation includes a combination of the first transformation part with a second transformation part having the second resolution.

E7. The method of any of embodiments E1-E6, further comprising receiving one of the following from a first UE:
an estimated position of the first UE, or
angular measurements of at least a portion of the plurality of beams for which angular positioning assistance data was transmitted.

E8. The method of embodiment E7, wherein the angular measurements for each particular beam include one of the following:
a first measurement part having a first measurement resolution; or
a combination of the first measurement part with a second measurement part having a second measurement resolution that is greater than the first measurement resolution.

E9. The method of embodiment E8, wherein the angular measurements for each particular beam include measured azimuth and elevation angles.

E10. A method, performed by user equipment (UE), for receiving positioning assistance data from a network node in a wireless network, the method comprising:
receiving, from a network node, angular positioning assistance data for a plurality of beams transmitted by one or more transmission reception points (TRPs), wherein for each particular beam the angular positioning assistance data includes a first part having a first resolution and, optionally, a second part having a second resolution that is greater than the first resolution;
determining angular configurations of the plurality of beams based on the angular positioning assistance data; and
based on the determined angular configurations, performing angular measurements on at least a portion of the plurality of beams.

E11. The method of embodiment E10, wherein, for each particular beam:
when the angular positioning assistance data includes only the first part, the angular configuration for the particular beam is determined according to the first resolution; and
when the angular positioning assistance data includes both the first part and the second part, the angular configuration for the particular beam is determined according to the second resolution.

E12. The method of any of embodiments E10-E11, wherein the angular positioning assistance data is received according to one of the following:
via unicast signaling from the network node; or
broadcast in a cell of the wireless network.

E13. The method of any of embodiments E10-E12, wherein:
the method further comprises transmitting, to the network node, an indication of the
UE's capability for utilizing the second part having the second resolution;
the second part is included based on the indication; and
the angular positioning assistance data is received by the UE by unicast signaling.

E14. The method of any of embodiments E10-E13, wherein:
the angular positioning assistance data includes azimuth and elevation angles for each particular beam; and
each azimuth or elevation angle includes one of the following:
a first azimuth or elevation part having the first resolution; or
a combination of the first azimuth or elevation part with a second azimuth or elevation part having the second resolution.

E15. The method of any of embodiments E10-E14, wherein:
the angular positioning assistance data also includes a coordinate transformation for the plurality of beams; and
the coordinate transformation includes one of the following:
a first transformation part having the first resolution; or
a combination of the first transformation part with a second transformation part having the second resolution.

E16. The method of embodiment E15, wherein:
determining the angular configuration for the plurality of beams comprises determining and applying a common coordinate transformation;
when the angular positioning assistance data includes only the first transformation part, the common coordinate transformation is determined according to the first resolution; and
when the angular positioning assistance data includes both the first transformation part and the second transformation part, the common coordinate transformation is determined according to the second resolution.

E17. The method of any of embodiments E10-E16, further comprising:
for each particular measured beam, determining a resolution of the angular measurements; and
transmitting the angular measurements to the network node, wherein for each particular measured beam, the transmitted angular measurements include:
a first measurement part having a first measurement resolution; and
when the determined resolution of the angular measurements is greater than the first measurement resolution, a second part having a second measurement resolution that is greater than the first measurement resolution.

E18. The method of embodiment E17, wherein the angular measurements for each particular measured beam include measured azimuth and elevation angles.

E19. The method of any of embodiments E10-E16, further comprising:
estimating the UE's position based on the angular measurements; and
transmitting the estimated position to the network node.

E20. A network node, in a wireless network, configured to provide angular positioning assistance data to one or more user equipment (UEs), the network node comprising:
a communication interface configured to communicate with the UEs via one or more further nodes in the wireless network; and
processing circuitry operatively coupled to the communication interface, whereby the processing circuitry and the communication interface are configured to perform operations corresponding to any of the methods of embodiments E1-E9.

E21. A network node, in a wireless network, configured to provide angular positioning assistance data to one or more user equipment (UEs), the network node being further arranged to perform operations corresponding to any of the methods of embodiments E1-E9.

E22. A non-transitory, computer-readable medium storing computer-executable instructions that, when executed by processing circuitry of a network node, in a wireless network, configured to provide angular positioning assistance data to one or more user equipment (UEs), configure the network node to perform operations corresponding to any of the methods of embodiments E1-E9.

E23. A computer program product comprising computer-executable instructions that, when executed by processing circuitry of a network node, in a wireless network, configured to provide angular positioning assistance data to one or more user equipment (UEs), configure the network node to perform operations corresponding to any of the methods of embodiments E1-E9.

E24. A user equipment (UE) configured to receive angular positioning assistance data from a network node in a wireless network, the UE comprising:
radio transceiver circuitry configured to communicate with the network node via one or more further nodes in the wireless network; and
processing circuitry operatively coupled to the radio transceiver circuitry, whereby the processing circuitry and the radio transceiver circuitry are configured to perform operations corresponding to any of the methods of embodiments E10-E19.

E25. A user equipment (UE) configured to receive angular positioning assistance data from a network node in a wireless network, the UE being further arranged to perform operations corresponding to any of the methods of embodiments E10-E19.

E26. A non-transitory, computer-readable medium storing computer-executable instructions that, when executed by processing circuitry of a user equipment (UE) configured to receive angular positioning assistance data from a network node in a wireless network, configure the UE to perform operations corresponding to any of the methods of embodiments E10-E19.

E27. A computer program product comprising computer-executable instructions that, when executed by processing circuitry of a user equipment (UE) configured to receive angular positioning assistance data from a network node in a wireless network, configure the UE to perform operations corresponding to any of the methods of embodiments E10-E19.

The invention claimed is:

1. A method, performed by a network node, for providing positioning assistance data to one or more user equipment (UEs) in a wireless network, the method comprising:
determining an angular resolution of angular positioning assistance data for each particular beam of a plurality of beams transmitted by one or more transmission reception points (TRPs) in the wireless network; and
transmitting, to one or more UEs, the angular positioning assistance data for the plurality of beams, wherein for each particular beam the angular positioning assistance data includes:
a first part having a first resolution; and
when the determined angular resolution for the particular beam is greater than the first resolution, a second part having a second resolution that is greater than the first resolution.

2. The method of claim 1, wherein the angular positioning assistance data is transmitted according to one of the following:
via unicast signaling from the network node to the one or more UEs; or
broadcast in a cell of the wireless network.

3. The method of claim 1, wherein determining the angular resolution of angular positioning assistance data for each particular beam is based on one or more of the following:
a degree of accuracy to which angular information for the particular beam is known by the network node;
a number of beams comprising the plurality of beams; and
one or more size constraints on messages used for delivery of the angular positioning assistance data.

4. The method of claim 1, wherein:
the method further comprises receiving, from a first UE, an indication of whether the first UE is capable of using angular positioning assistance data having the second resolution; and
the angular positioning assistance data is transmitted to the first UE via unicast signaling and does not include the respective second parts when the indication indicates that the first UE is not capable of using angular positioning assistance data having the second resolution.

5. The method of claim 1, wherein:
the angular positioning assistance data for the plurality of beams includes respective azimuth angles and respective elevation angles;
the respective azimuth angles include respective first azimuth parts having the first resolution;
the respective elevation angles include respective first elevation parts having the first resolution; and
when the determined angular resolution for a particular beam is greater than the first resolution:
the azimuth angle for the particular beam includes a second azimuth part having the second resolution, and
the elevation angle for the particular beam includes a second elevation part having the second resolution.

6. The method of claim 5, wherein:
the angular positioning assistance data also includes a coordinate transformation for the respective azimuth angles and the respective elevation angles;
the coordinate transformation includes a first transformation part having the first resolution; and
when the determined angular resolution for at least one of the beams is greater than the first resolution, the coordinate transformation also includes a second transformation part having the second resolution.

7. The method of claim 1, further comprising receiving one of the following from a first UE:
an estimated position of the first UE, or
angular measurements of at least a portion of the plurality of beams for which angular positioning assistance data was transmitted.

8. The method of claim 7, wherein the angular measurements for each measured beam include:
a first measurement part having a first measurement resolution; and
when a resolution of the angular measurements for the measured beam is greater than the first measurement resolution, a second part having a second measurement resolution that is greater than the first measurement resolution.

9. The method of claim 8, wherein the angular measurements for each measured beam include a measured azimuth angle and a measured elevation angle.

10. The method of claim 7, further comprising estimating the UE's position based on the angular measurements.

11. A method performed by user equipment (UE) for positioning in a wireless network, the method comprising:
receiving, from a network node, angular positioning assistance data for a plurality of beams transmitted by one or more transmission reception points (TRPs) in the wireless network, wherein for each particular beam the angular positioning assistance data includes:
a first part having a first resolution, and
when an angular resolution of the angular positioning assistance data for the particular beam is greater than the first resolution, a second part having a second resolution that is greater than the first resolution;
determining angular configurations of the plurality of beams based on the angular positioning assistance data; and
performing angular measurements on at least a portion of the plurality of beams based on the determined angular configurations.

12. The method of claim 11, wherein:
when the angular positioning assistance data for a particular beam includes only the first part, the angular configuration for the particular beam is determined according to the first resolution; and
when the angular positioning assistance data for the particular beam includes the first part and the second part, the angular configuration for the particular beam is determined according to the second resolution.

13. The method of claim 11, wherein the angular positioning assistance data is received according to one of the following:
via unicast signaling from the network node; or
broadcast in a cell of the wireless network.

14. The method of claim 11, wherein:
the method further comprises transmitting, to the network node, an indication of whether the UE is capable of using angular positioning assistance data having the second resolution; and
the angular positioning assistance data is received by the UE via unicast signaling and does not include the second part when the indication indicates that the UE is not capable of using angular positioning assistance data having the second resolution.

15. The method of claim 11, wherein:
the angular positioning assistance data for the plurality of beams includes respective azimuth angles and respective elevation angles;
the respective azimuth angles include respective first azimuth parts having the first resolution;
the respective elevation angles include respective first elevation parts having the first resolution; and
when the angular resolution for a particular beam is greater than the first resolution:
the azimuth angle for the particular beam includes a second azimuth part having the second resolution,
the elevation angle for the particular beam includes a second elevation part having the second resolution.

16. The method of claim 15, wherein:
the angular positioning assistance data also includes a coordinate transformation for the plurality of beams; and
determining the angular configurations for the plurality of beams comprises applying the coordinate transformation to the respective azimuth angles and the respective elevation angles.

17. The method of claim 16, wherein:
the coordinate transformation includes a first transformation part having the first resolution; and
when an angular resolution for at least one of the beams is greater than the first resolution, the coordinate transformation also includes a second transformation part having the second resolution.

18. The method of claim 11, further comprising:
for each measured beam, determining a resolution of the angular measurements for the measured beam; and
transmitting the angular measurements to the network node, wherein the transmitted angular measurements for each measured beam include:
a first measurement part having a first measurement resolution, and
when the determined resolution of the angular measurements for the measured beam is greater than the first measurement resolution, a second part having a second measurement resolution that is greater than the first measurement resolution.

19. The method of claim 11, further comprising:
estimating the UE's position based on the angular measurements; and
transmitting the estimated position to the network node.

20. The method of claim 11, wherein the angular measurements for each measured beam include a measured azimuth angle and a measured elevation angle.

21. A network node configured to provide positioning assistance data to one or more user equipment (UEs) in a wireless network, the network node comprising:
communication interface circuitry configured to communicate with the UEs via the wireless network; and
processing circuitry operatively coupled to the communication interface circuitry,
whereby the processing circuitry and the communication interface circuitry are configured to:
determine an angular resolution of angular positioning assistance data for each particular beam of a plurality of beams transmitted by one or more transmission reception points (TRPs) in the wireless network; and
transmit, to one or more UEs, the angular positioning assistance data for the plurality of beams, wherein for each particular beam the angular positioning assistance data includes:
a first part having a first resolution; and
when the determined angular resolution for the particular beam is greater than the first resolution, a second part having a second resolution that is greater than the first resolution.

22. The network node of claim 21, wherein:
the processing circuitry and the communication interface circuitry are further configured to receive, from a first UE, an indication of whether the first UE is capable of using angular positioning assistance data having the second resolution; and
the angular positioning assistance data is transmitted to the first UE via unicast signaling and does not include the respective second parts when the indication indicates that the first UE is not capable of using angular positioning assistance data having the second resolution.

23. The network node of claim 21, wherein:
the angular positioning assistance data for the plurality of beams includes respective azimuth angles and respective elevation angles;
the respective azimuth angles include respective first azimuth parts having the first resolution;
the respective elevation angles include respective first elevation parts having the first resolution; and
when the determined angular resolution for a particular beam is greater than the first resolution:
the azimuth angle for the particular beam includes a second azimuth part having the second resolution, and
the elevation angle for the particular beam includes a second elevation part having the second resolution.

24. A user equipment (UE) configured for positioning in a wireless network, the UE comprising:
radio transceiver circuitry configured to communicate with a network node via the wireless network; and
processing circuitry operatively coupled to the radio transceiver circuitry, whereby the processing circuitry and the radio transceiver circuitry are configured to:
receive, from the network node, angular positioning assistance data for a plurality of beams transmitted by one or more transmission reception points (TRPs) in the wireless network, wherein for each particular beam the angular positioning assistance data includes:
a first part having a first resolution, and
when an angular resolution of the angular positioning assistance data for
the particular beam is greater than the first resolution, a second part having a second resolution that is greater than the first resolution;
determine angular configurations of the plurality of beams based on the angular positioning assistance data; and
perform angular measurements on at least a portion of the plurality of beams based on the determined angular configurations.

25. The UE of claim 24, wherein:
the processing circuitry and the radio transceiver circuitry are further configured to transmit, to the network node, an indication of whether the UE is capable of using angular positioning assistance data having the second resolution; and
the angular positioning assistance data is received by the UE via unicast signaling and does not include the second part when the indication indicates that the UE is not capable of using angular positioning assistance data having the second resolution.

26. The UE of claim 24, wherein:
the angular positioning assistance data for the plurality of beams includes respective azimuth angles and respective elevation angles;
the respective azimuth angles include respective first azimuth parts having the first resolution;
the respective elevation angles include respective first elevation parts having the first resolution; and
when the angular resolution for a particular beam is greater than the first resolution:
the azimuth angle for the particular beam includes a second azimuth part having the second resolution,
the elevation angle for the particular beam includes a second elevation part having the second resolution.

\* \* \* \* \*